United States Patent [19]
Monzaki et al.

[11] Patent Number: 5,707,120
[45] Date of Patent: Jan. 13, 1998

[54] STABILITY CONTROL DEVICE OF VEHICLE IMPROVED AGAINST HUNTING

[75] Inventors: Shirou Monzaki, Mishima; Shoji Inagaki, Numazu, both of Japan

[73] Assignee: Toyota Jidosha Kabushiki Kaisha, Toyota, Japan

[21] Appl. No.: 732,876

[22] Filed: Oct. 16, 1996

[30] Foreign Application Priority Data

Oct. 18, 1995 [JP] Japan .................. 7-294754

[51] Int. Cl.$^6$ .................. B60T 8/24; B60T 8/58
[52] U.S. Cl. .................. 303/146; 364/426.016
[58] Field of Search .................. 303/140, 146, 303/147, 157; 364/426.016

[56] References Cited

U.S. PATENT DOCUMENTS 5,188,434  2/1993  Ruf et al. .................. 303/146
5,251,137  10/1993  Chin et al. .................. 303/DIG. 6 X

FOREIGN PATENT DOCUMENTS 6-24304  2/1994  Japan .

Primary Examiner—Josie Ballato
Attorney, Agent, or Firm—Oliff & Berridge, P.L.C.

[57] ABSTRACT

A stability control device of a vehicle having an estimator for estimating a liability of the vehicle body to a turn running instability for producing an instability quantity which generally increases along with an increase of the liability; a brake system for selectively applying a variable braking force to each of the wheels; and a controller for controlling the brake system so as variably to apply a braking force to a selected one or ones of the wheels at a rate calculated based upon the instability quantity for suppressing the vehicle body against the turn running instability, wherein the controller sets a maximum possible value of the rate so that the maximum possible value being lowered along with increase of time of applying the braking force.

5 Claims, 5 Drawing Sheets

STABILITY CONTROL DEVICE OF VEHICLE IMPROVED AGAINST HUNTING

BACKGROUND OF THE INVENTION

1. Field of the Invention

The present invention relates generally to a behavior control of a vehicle such as an automobile for improving the turn running stability thereof, and more particularly, to a stability control device for more desirably suppressing the vehicle against turn running instability such as spin and drift-out without causing a hunting of control.

2. Description of the Prior Art

It is well known that the automobiles and the like vehicles are, when unduly operated, liable to instability such as spin and drift-out, because the side force applied to the vehicle body as a centrifugal force can increase with no limit along with increase of vehicle speed and steering angle, while the tire grip force for holding and steering the vehicle along the road surface against the side force is limited, particularly to be less on a slippery wet road.

Various endeavors have been made to suppress the automobiles and the like vehicles against spin and/or drift-out. An example is shown in Japanese Patent Laid-open Publication 6-24304, according to which controlled braking forces are applied to respective wheels by a feedback control system such that the actual yaw rate of the vehicle body conforms to a target yaw rate calculated based upon running conditions of the vehicle including steering condition.

In similar endeavors for further improving the vehicle stability against spin and/or drift-out of the vehicle, the present inventors have particularly noted that a hunting movement of the vehicle body can occur in the yawing directions due to a stability control of the vehicle against spin and/or drift-out.

In four wheeled vehicles, it is effective for suppressing the vehicle against a spin during its turn running to apply a braking force to a front wheel at the outside of the turn, so as thereby to generate an anti-spin moment in the vehicle body around the braked front wheel. Further, as also well known in the art, a drift-out is effectively suppressed by braking the vehicle, particularly at the rear wheels, so that the vehicle is decelerated to decrease the centrifugal force applied thereto, with an accompanying effect that, when the rear wheels are braked, the lateral vector component of the tire grip force of the rear wheels is decreased by an addition of a longitudinal vector component generated by the braking, as the total vector of the tire grip force available is limited and saturates in all directions as defined by the so-called friction circle, thereby allowing the rear wheels to slip outside of the turn, thus forwarding the running vehicle toward inside of the turn.

In such a vehicle stability control, it is conventional that a liability of the vehicle to a turn running instability such as spin or drift-out is estimated based upon a certain parameter regarding the running conditions of the vehicle, and the braking force is applied to a pertinent wheel or wheels at a magnitude generally proportional to the magnitude of the estimated instability. However, when the instability of the vehicle shows a certain cycle of fluctuation, if the stability control is executed to simply follow the magnitude of the estimated instability, the instability is augmented due to a resonance between the natural frequency of the vehicle body in the yawing movement and the cycle of application of the stability control.

SUMMARY OF THE INVENTION

In view of the above inconvenience, it is a principal object of the present invention to provide a more improved stability control device of a vehicle such as an automobile which can effectively suppress the vehicle against instability such as spin and drift-out without causing a hunting of the control.

In order to accomplish the above-mentioned object, we propose a stability control device of a vehicle having a vehicle body, and front left, front right, rear left and rear right wheels, comprising:

a means for estimating a liability of the vehicle body to a turn running instability for producing an instability quantity which generally increases along with increase of said liability;

a brake means for selectively applying a variable braking force to each of said wheels; and a control means for controlling said brake means so as variably to apply a braking force to a selected one or ones of said wheels at a rate calculated based upon said instability quantity for suppressing the vehicle body against said turn running instability;

wherein said control means restricts maximum value of said rate so as to be lowered along with lapse of time of applying the braking force.

By said control means restricting the maximum value of said rate of applying the braking force to the selected wheel or wheels appropriately along with lapse of time of applying the braking force, it is avoided that the stability control rather augments the instability of the vehicle.

The stability control device of the above-mentioned construction may further be constructed such that said control means cancels more of said restriction along with lapse of time of not executing the braking.

The stability control device of the above-mentioned construction may further be constructed such that said control means varies said maximum value so as to be decreased along with lapse of time of applying the braking force when the time lapse exceeds a threshold value determined therefor. Further, the stability control device of the above-mentioned construction may further be constructed such that said control means varies said maximum value so as to be decreased along with lapse of time of applying the braking force until the time lapse attains a threshold value determined therefor. By such an arrangement, the adaptability of the present invention to particular resonance performance of each design of vehicle is more broadened.

The stability control device of the above-mentioned construction may be a spin suppress control device, wherein said turn running instability is spin value which represents a liability of the vehicle body to spin, and said selected wheel to which the braking force is applied is one of the front wheels serving at the outside of a turn running of the vehicle.

BRIEF DESCRIPTIONS OF THE DRAWINGS

In the accompanying drawings.

DESCRIPTION OF THE EMBODIMENT

In the following, the present invention will be described in more detail in the form of a preferred embodiment with reference to the accompanying drawings.

Figure 1:
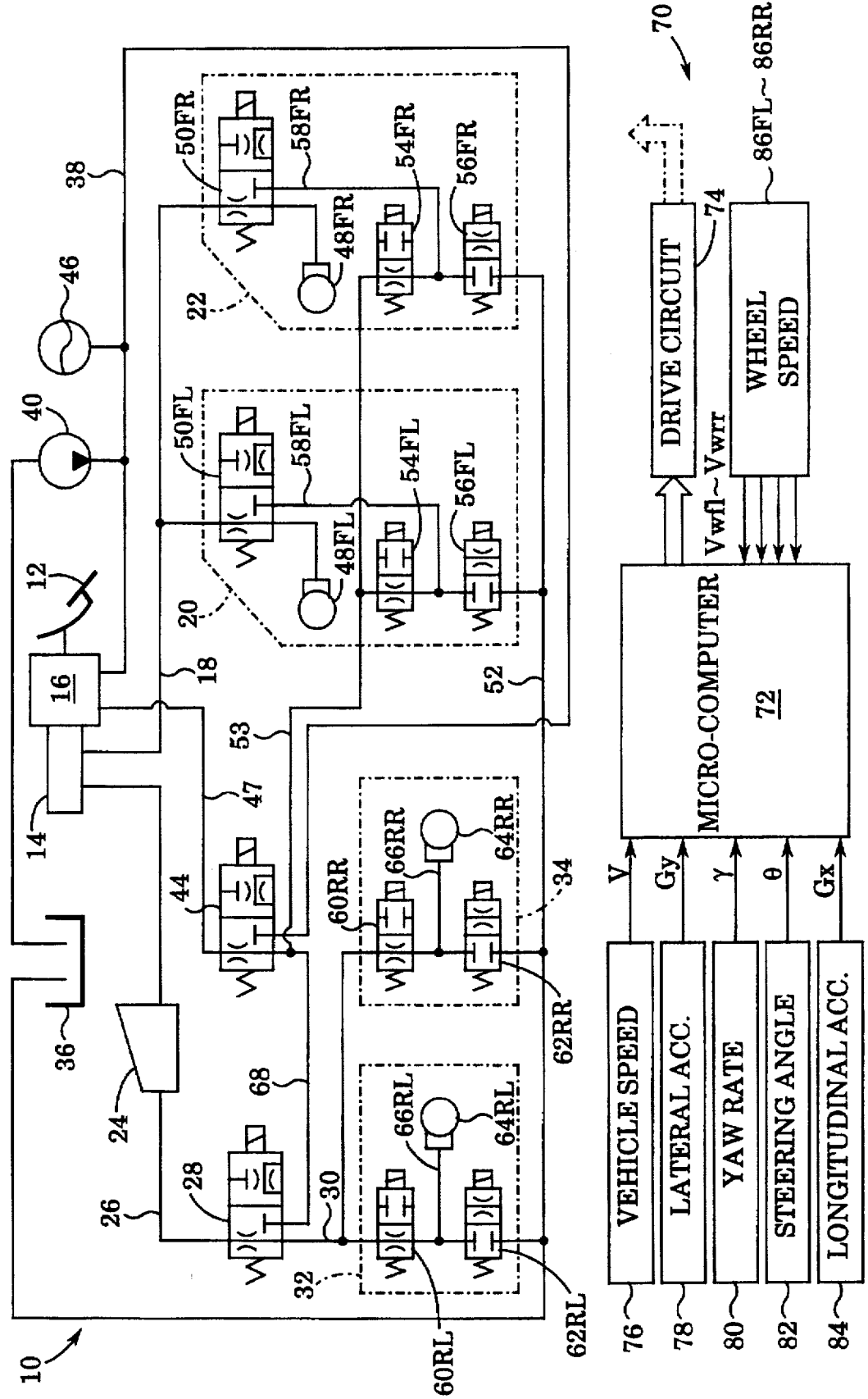
FIG. 1 is a diagrammatic illustration of hydraulic circuit means and electrical control means of an embodiment of the stability control device according to the present invention.

First, referring to FIG. 1 showing diagrammatically an embodiment of the stability control device of the present invention with regard to the constructions of its hydraulic circuit means and its electric control means, the hydraulic circuit means generally designated by 10 comprises a conventional manual brake pressure source means including a brake pedal 12 to be stepped on by a driver, a master cylinder 14 adapted to generate a master cylinder pressure according to the stepping-on of the brake pedal 12, and a hydro-booster 16 which generates a booster pressure.

The hydraulic means 10 further comprises a powered brake pressure source means including a reservoir 36 and a brake fluid pump 40 which delivers a pressurized brake fluid to a passage 38 to which an accumulator 46 is connected, so that a stabilized accumulator pressure for the automatic brake control described hereinbelow is available in the passage 38. The accumulator pressure is also supplied to the hydro-booster 16 as a pressure source for generating a booster pressure which has substantially the same pressure performance as the master cylinder pressure depending upon the stepping-on performance of the brake pedal 12 but is capable to maintain such a pressure performance while the brake fluid is being consumed by a series connection of a normally open type on-off valve and a normally closed type on-off valve to obtain a desired brake pressure, as described hereinbelow.

A first passage 18 extends from a first port of the master cylinder 14 to a front left wheel brake pressure control means 20 and a front fight wheel brake pressure control means 22. A second passage 26, including a proportioning valve 24, extends from a second port of the master cylinder 14 toward both of a rear left wheel brake pressure control means 32 and a rear right wheel brake pressure control means 34, via a 3-ports-2-positions changeover type electromagnetic control valve 28, an outlet port of which is connected, via a common passage 30, with the rear left and right wheel brake pressure control means 32 and 34.

The brake pressure control means 20 and 22 of the front left and front right wheels include wheel cylinders 48FL and 48FR for applying variable braking forces to the front left and front right wheels, 3-ports-2-positions changeover type electromagnetic control valves 50FL and 50FR, and series connections of normally open type electromagnetic on-off valves 54FL and 54FR and normally closed type electromagnetic on-off valves 56FL and 56FR, respectively, said series connections of the normally open type on-off valves and the normally closed type on-off valves being connected between a passage 53 adapted to be supplied with the accumulator pressure of the passage 38 or the booster pressure from the hydro-booster through a 3-ports-2-positions changeover type electronic control valve 44 the operation of which is described hereinbelow, and a return passage 52 connected to the reservoir 36. A mid point of the series connection of the on-off valves 54FL and 56FL is connected to a port of the control valve 50FL by a connection passage 58FL, and a mid point of the series connection of the on-off valves 54FR and 56FR is connected to a port of the control valve 50FR by a connection passage 58FR.

The brake pressure control means 32 and 34 of the rear left and rear right wheels include wheel cylinders 64RL and 64RR for applying braking force to the rear left and rear right wheels, respectively, and series connections of normally open type electromagnetic on-off valves 60RL and 60RR and normally closed type electromagnetic on-off valves 62RL and 62RR, said series connections of normally open type on-off valves and the normally closed type on-off valves being connected between the passage 30 connected to the one outlet port of the control valve 28 and the return passage 52. A mid point of the series connection of the on-off valves 60RL and 62RL is connected to a wheel cylinder 64RL for applying braking force to the rear left wheel by a connection passage 66RL, and a mid point of the series connection of the on-off valves 60RR and 62RR is connected to a wheel cylinder 64RR for applying braking force to the rear right wheel by a connection passage 66RR.

The control valves 50FL and 50FR are respectively switched over between a first position for connecting the wheel cylinders 48FL and 48FR with the manual brake pressure passage 18, while disconnecting them from the connection passages 58FL and 58FR, respectively, as in the state shown in the figure, and a second position for disconnecting the wheel cylinders 48FL and 48FR from the passage 18, while connecting them with the connection passages 58FL and 58FR, respectively.

The control valve 28 is switched over between a first position for connecting the passage 30 for both of the series connection of the on-off valves 60RL and 62RL and the series connection of the on-off valves 60RR and 62RR with the manual brake pressure passage 26 as in the state shown in the figure, and a second position for disconnecting the passage 30 from the passage 26, while connecting it with a passage 68 connected to one outlet port of the changeover control valve 44 together with the passage 53, so as to be connected with either a delivery port of the hydro-booster 16 or the accumulator pressure passage 38, according to whether the control valve 44 is in a first position such as shown in the figure or a second position opposite thereto.

When the control valves 50FL, 50FR and 28 are in the first position as in the state shown in the figure, the wheel cylinders 48FL, 48FR, 64RL, 64RR are connected with the manual brake pressure passages 18 and 26 so as to be supplied with the pressure of the master cylinder 14 to the respective wheel cylinders, thereby enabling the driver to apply a braking force to each wheel according to the stepping-on of the brake pedal 12. When the control valve 28 is changed over to the second position, with the control valve 44 being kept at the shown first position, the rear wheel cylinders 64RL and 64RR are supplied with the booster pressure according to the stepping-on of the brake pedal from the hydro-booster 16. When the control valves 50FL, 50FR, 28 and 44 are changed over to the second position, the wheel cylinders 48FL, 48FR, 64RL, 64RR are supplied with the powered accumulator brake pressure of the passage 38 under the control of the normally open on-off valves 54FL, 54FR, 60RL, 60RR and the normally closed type on-off valves 56FL, 56FR, 62RL, 62RR according to the ratio of the open state of the corresponding normally open type on-off valve and the closed state of the corresponding normally closed type on-off valve, i.e. the so-called duty ratio, apart from the stepping-on of the brake pedal 12.

The changeover control valves 50FL, 50FR, 28, 44, normally open type on-off valves 54FL, 54FR, 60RL, 60RR, normally closed type on-off valves 56FL, 56FR, 62RL, 62RR and the pump 40 are all controlled by an electric control means 70 as described in detail hereinbelow. The electric control means 70 consists of a micro-computer 72 and a driving circuit means 74. Although not shown in detail in FIG. 1, the micro-computer 72 may have a general construction including a central processing unit, a read only memory, a random access memory, input and output port means and a common bus interconnecting these functional elements.

The input port means of the micro-computer 72 is supplied with a signal showing vehicle speed V from a vehicle speed sensor 76, a signal showing lateral acceleration Gy of the vehicle body from a lateral acceleration sensor 78 mounted substantially at a mass center of the vehicle body, a signal showing yaw rate γ of the vehicle body from a yaw rate sensor 80, a signal showing steering angle θ from a steering angle sensor 82, a signal showing longitudinal acceleration Gx of the vehicle body from a longitudinal acceleration sensor 84 mounted substantially at the mass center of the vehicle body, and signals showing wheel speed (wheel circumferential speed) Vwfl, Vwfr, Vwrl, Vwrr of front left and right wheels and rear left and right wheels not shown in the figure from wheel speed sensors 86FL–86RR, respectively. The lateral acceleration sensor 78, yaw rate sensor 80 and steering angle sensor 82 detect the lateral acceleration, yaw rate and steering angle, respectively, as being positive when the vehicle makes a left turn, and the longitudinal acceleration sensor 84 detects longitudinal acceleration as being positive when the vehicle is accelerated in the forward direction. In general, in the following analyses, the parameters which are distinctive of the direction of turn of the vehicles are each assumed to be positive when the turn is counter-clockwise and negative when the turn is clockwise, as viewed from the top of the vehicle.

Figure 2:
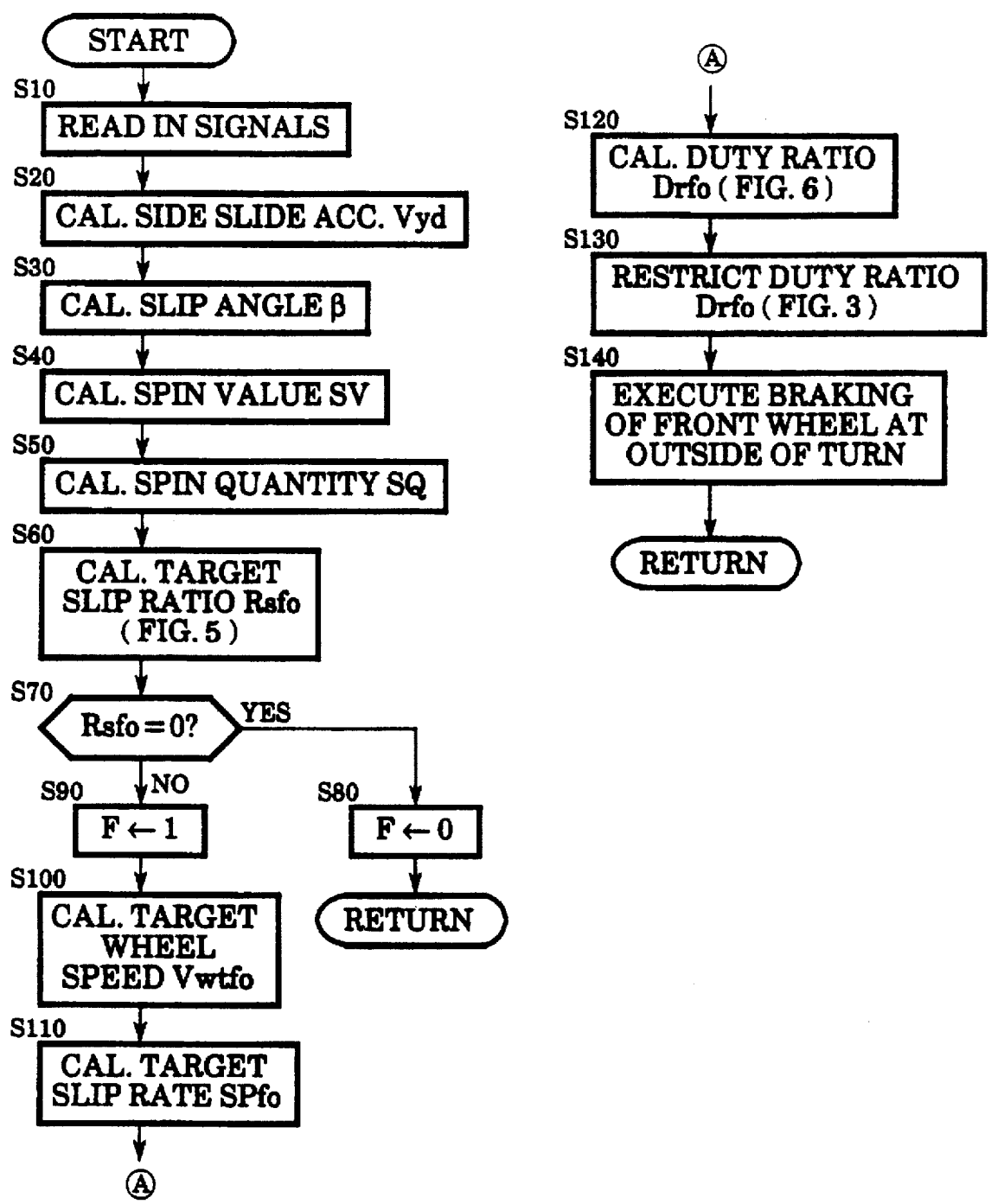
FIG. 2 is a flowchart showing an embodiment of the stability control routine conducted by the device of the present invention.
Figure 3:
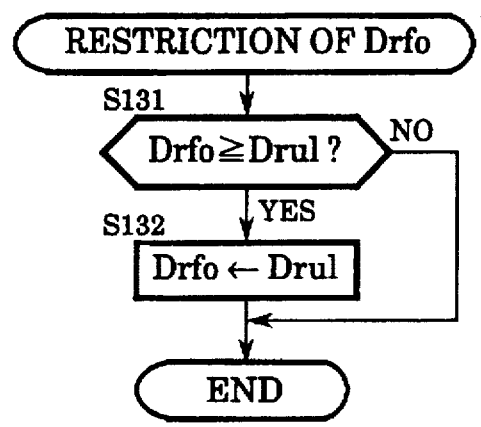
FIG. 3 is a flowchart showing a routine corresponding to step 130 of FIG. 2.
Figure 4:
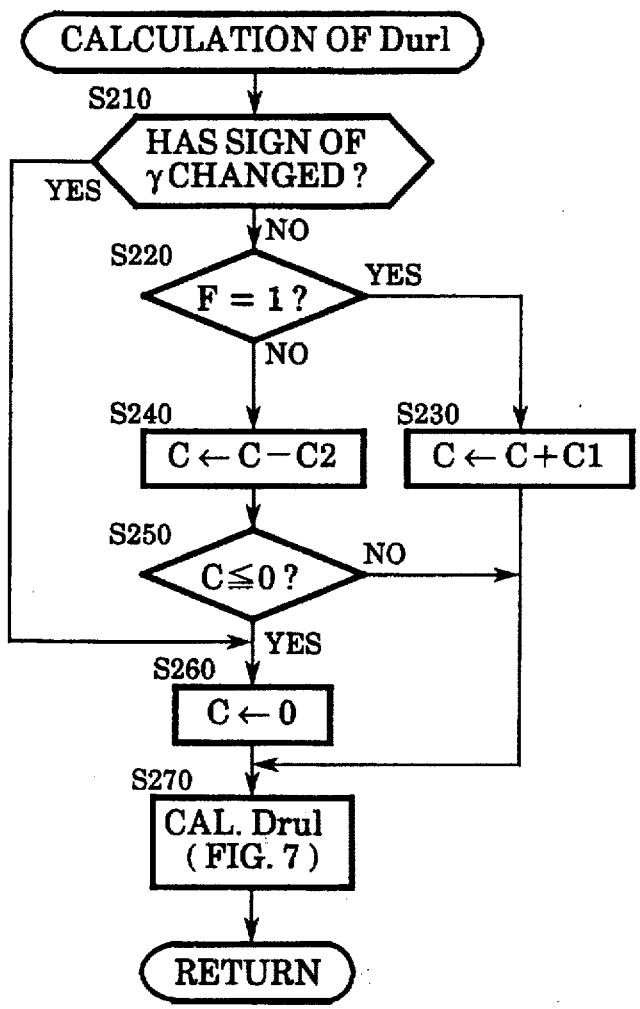
FIG. 4 is a flowchart showing a sub-routine for determining the restriction applied to the duty ratio according to lapse of time of execution of the stability control.
Figure 5:
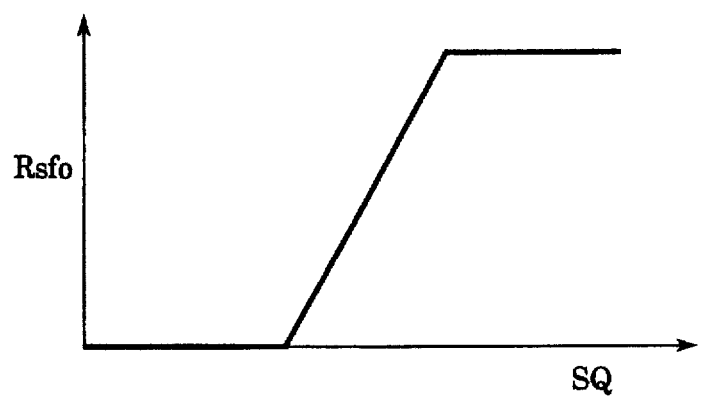
FIG. 5 is a map showing the relationship between slip ratio Rsfo of the front wheel at the outside of the turn and the absolute value of spin quantity SQ.
Figure 6:
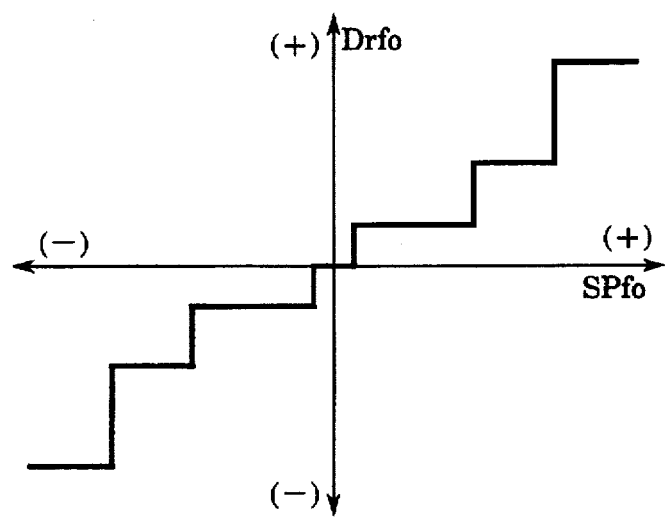
FIG. 6 is a map showing the relationship between duty ratio Drfo and slip rate SPfo of the front wheel at the outside of the turn.
Figure 7:
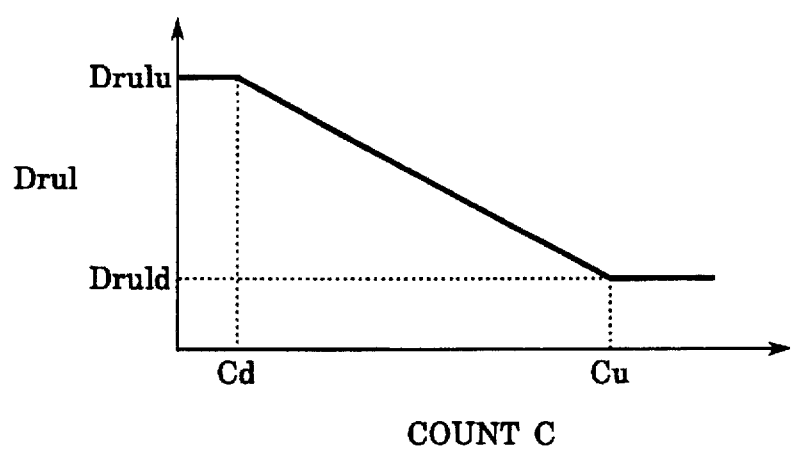
FIG. 7 is a map showing an example of the restriction applied to the duty ratio along with lapse of time.

The read only memory of the micro-computer 72 stores such flowcharts as shown in FIGS. 2–4 and such maps as shown in FIGS. 5–7. The central processing unit conducts calculations based upon the parameters detected by the above-mentioned various sensors according to those flowcharts and maps as described hereinbelow, so as to obtain the spin quantity for judging and estimating the liability of the vehicle to spin, and controls the turn behavior of the vehicle based upon the estimated spin quantity, particularly to suppress the vehicle against spin, by applying a variable braking force to a front wheel at the outside of a turn.

In the following, the stability control device of the present invention is described with respect to an embodiment of controlling the vehicle against spin in the form of its control operation with reference to FIGS. 2–7. However, it will be understood that the vehicle can be controlled against the drift-out according to the same principle of the present invention. Therefore, the concept concerned with stability and instability in the present description should be construed to cover at least both of spin and drift-out. The control according to the flowchart of FIG. 2 is started by a closure of an ignition switch not shown in the figure and carried out repetitively at a predetermined time interval such as tens of micro-seconds.

In step 10, the signals including vehicle speed V from the vehicle speed sensor 76 and others are read in. In step 20, the difference between the actual lateral acceleration Gy detected by the lateral acceleration sensor 78 and a product of vehicle speed V and yaw rate γ is calculated to obtain side slide acceleration Vyd of the vehicle body as Vyd=Gy−V*γ.

Then, integrating Vyd on time basis, side slide velocity Vy is obtained. In step 30, slip angle β of the vehicle body is calculated as a ratio of the side slide velocity Vy to the longitudinal velocity Vx of the vehicle body (=vehicle speed V), as β=Vy/Vx.

In step 40, taking two positive constants K1 and K2 appropriately, a value herein called spin value SV is calculated as a linear sum of the slip angle β and the side slide velocity Vyd, such as SV=K1*β+K2*Vyd. It will be appreciated that the spin value SV is a parameter which shows the liability of the vehicle body to spin. As is usual in the analysis of this art, the sign of those parameters as yaw rate γ, slip angle β and the above-mentioned spin value SV based thereupon specifies the direction of turn of the vehicle such that a positive value of those parameters indicates that the vehicle is making a left turn, while a negative value of those parameters indicates that the vehicle is making a right turn.

In step 50, the direction of turn of the vehicle is judged from the sign of yaw rate γ, and a parameter herein called spin quantity SQ is determined to be equal to SV when the spin value SV is positive, and to be equal to -SV when the spin value SV is negative. Or, the spin quantity may be determined to be more sensitive about the variety of turn stability of the vehicle such that, when the spin value SV is positive in conformity with the yaw rate γ being positive, the spin quantity SQ is equal to SV but if the spin value SV is negative against the positive yaw rate γ, the spin quantity SQ is made zero, and similarly, when the spin value SV is negative in conformity with the yaw rate γ being negative, the spin quantity SQ is equal to −SV but if the spin value SV is positive against the negative yaw rate γ, the spin quantity SQ is made zero. As will be appreciated, the spin quantity SQ is a parameter which shows the liability of the vehicle body to spin.

In step 60, a target slip ratio Rsfo of the front wheel at the outside of the turn is obtained based upon the spin quantity SQ by referring to a map such as shown in FIG. 5.

In step 70, it is judge if the target slip ratio Rsfo is zero. When the answer is yes, indicating that there is no substantial need of the stability control, the control returns to step 10 through step 80 for resetting flag F to zero, giving a signal that the stability control is not being executed. When the answer of step 70 is no, the control is continued to proceed to step 90, where flag F is set to 1, giving a signal that the stability control is being executed, and then the control proceeds to step 100. In step 100, taking the wheel speed of the front wheel at the inside of the turn as a reference wheel speed Vb, a target wheel speed of the front wheel at the outside of the turn, which is to be braked, is calculated as follows:

$$Vwtfo=Vb*(100-Rsfo)/100 \quad (1)$$

In step 110, taking Vwfod as wheel acceleration of the front wheel at the outside of the turn (differential of Vwfo) and Ks as an appropriate positive constant, slip rates SPfo of the front wheel at the outside of the turn is calculated as follows:

$$SPfo=Vwfo-Vwtfo+Ks*(Vwfod-Gx) \quad (2)$$

In step 120, by referring to a map such as shown in FIG. 6, duty ratio Drfo for supply or exhausting the brake fluid to or from the wheel cylinder of the front wheel at the outside of the turn is calculated according to each temporal value of SPfo. Drfo indicates the ratio of on-duration to off-duration of the series connection of on-off valves 54FL vs. 56FL or 54FR vs. 56FR. The positive value of Drfo refers to the ratio of power off duration to power on duration of the normally open valve 54FL or 54FR with the normally closed valve 56FL or 56FR being continually powered off, while the negative value of Drfo refers to the ratio of power on duration to power off duration of the normally closed valve 56FL or 56FR with the normally open valve 54FL or 54FR being continually powered on.

In step 130, the duty ratio Drfo is modified according to a process shown in FIG. 3 not to exceed a maximum value Drul which is determined to show a performance such as shown in FIG. 7 according to the lapse of time of application of braking force executed by the present stability control. The determination of the maximum value Drul will be described hereinbelow with reference to FIG. 7. Referring to FIG. 3, in step 131 it is judged if the calculated duty ratio Drfo is equal to or greater than the maximum value Drul. If yes, then in step 132 the value of Drfo for actual use is restricted to the value of Drul. If not, step 132 is bypassed, so that Drfo is used at the value just as calculated in step 120.

In step 140, control valve 44 and control valve 50FL or 50FR corresponding to the front wheel at the outside of the turn are changed over to the respective second positions, and the serial connection of the normally open type on-off valve and the normally closed type on-off valve 54FL-56FL or 54FR-56FR are controlled according to the duty ratio Drfo, so that the front wheel at the outside of the turn is applied with a controlled braking force.

Now, referring to FIG. 4, the determination of the maximum value for restricting the duty ratio Drfo is described. First, in step 210 it is checked based upon the sign of yaw rate γif the direction of turn of the vehicle has changed. When the answer is yes, the situation is not an object of the present invention. Therefore, this routine is substantially bypassed. If the answer is no, the control proceeds to step 220, and it is further checked based upon flag F if the stability control is being carried out (F=1) or if the stability control is not being carried out (F=0). When the answer is yes, then in step 230 count number C of a counter is increased by an increment C1 to count a time of consecutive application of a stability control braking force, and then the control proceeds to step 270 to look up the map of FIG. 7 for the temporal maximum value to be imposed on the duty ratio Drfo. In the shown embodiment, the maximum value Drul is designed to be such that it remains constant at Drulu until the time count reaches Cd, then gradually lowers 5 down to Druld when the time count reaches Cu, and then remains at Druld thereafter. When the answer of step 220 is no, then in step 240 the count number C is decreased by a decrement C2. By such a combination of increment C1 and decrement C2, appropriately designing the magnitudes of C1 and C2, the probable resonance of the speed of application of the stability control with the natural frequency of the vehicle body in its yawing movement is avoided. In step 250, it is checked if the count down has reached the bottom, and if yes, the count number is correctly reset to zero.

Figure 8:
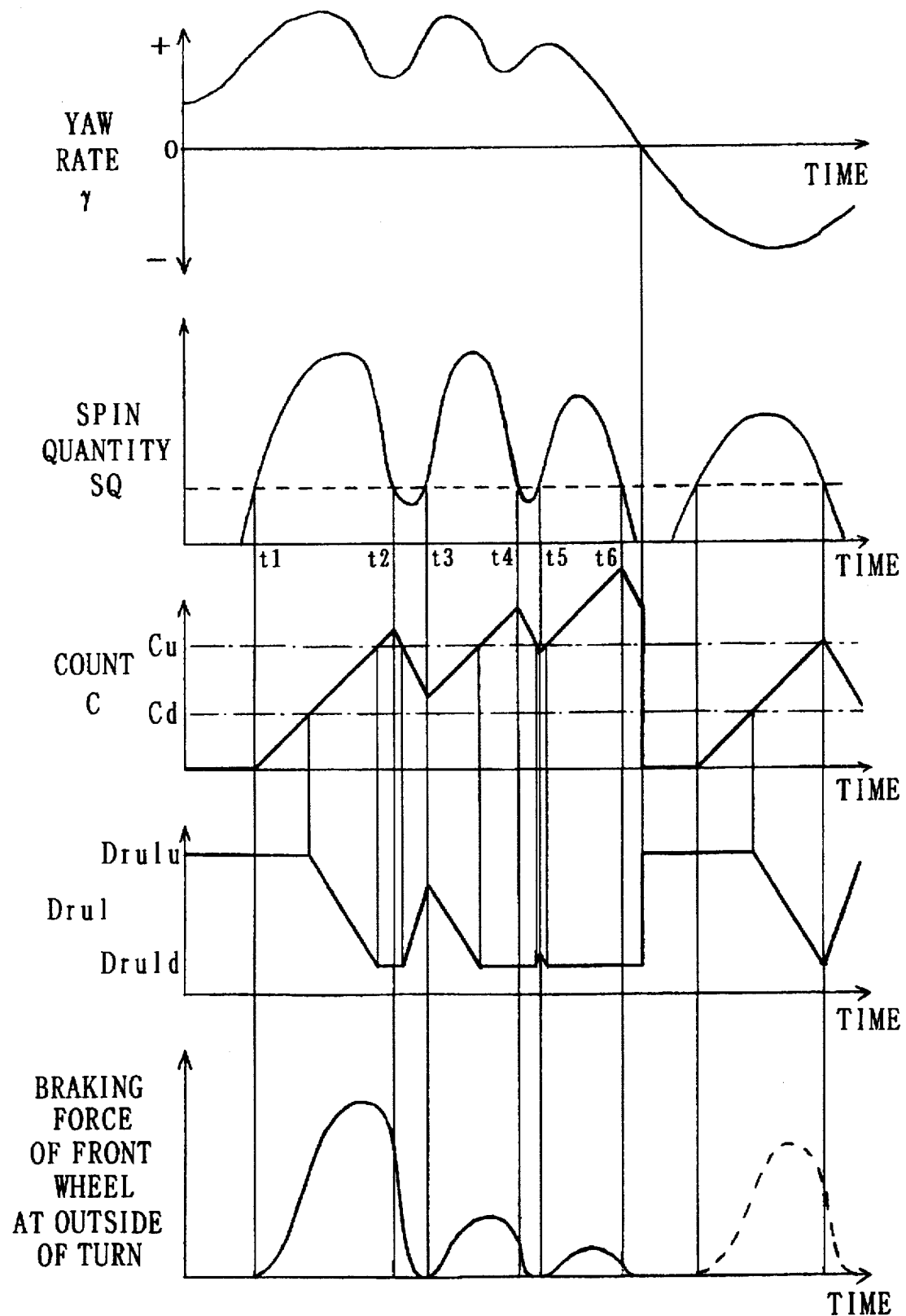
FIG. 8 is a set of graphs illustrating an example of the performance of several parameters during the execution of a spin suppress control according to the present invention.

FIG. 8 shows an example of the operation of the stability control device according to the present invention. It is supposed that a vehicle is being driven along a curved course, showing an unstable change of yaw rate such as shown in the first rank of the figure for some reasons, and the spin quantity SQ is detected as shown in the second rank of the figure. Further, it is assumed that the frequency of the peaks of the spin quantity SQ is unfortunately resonant with the natural frequency of the vehicle body in its yawing movement. If the stability control is executed according to the conventional method such that the braking for stability control is applied in the period of t1–t2, t3–t4 and t5–t6, the yawing of the vehicle will be rather augmented by the stability control. However, according to the present invention, when the instability occurs at such a frequency, the duty ratio which is actually executed is almost canceled due to the mismatching between the frequency of the spin quantity and the timing performance of the up-counting and down-counting of the counter, as will be appreciated from the time correspondent illustrations of spin quantity SQ, count value C and maximum duty ratio Drul. Therefore, in such an occasion, no substantial braking pressure for the stability control is generated as shown in the bottom rank of the figure.

Of course in this case the stability control is not effectively executed. However, non execution is much better than execution which augments the instability. When the stability control device according to the present invention is appropriately designed for each vehicle by considering the natural frequency of its yawing movement, the effectiveness of the stability control is fully ensured, except only a small operation range in which the stability control will exhibit an adverse effect.

Although the present invention has been described in the above with respect to controlling the vehicle against spin, it will be appreciated that the invention is similarly applicable to controlling the vehicle against drift-out, by changing the instability quantity expressed as the spin quantity SQ in the above-mentioned embodiment to a quantity which represents a liability of the vehicle body to drift-out, and applying the braking force to one or both of the rear wheels according to the pertinent calculations for such rear wheel braking for drift-out control, with a similar modification of the duty ratio of supplying and exhausting the brake fluid to and from the wheel cylinder or cylinders of the rear wheel or wheels. The above-mentioned pertinent calculations are shown in co-pending patent applications Nos. 08/726,325; 08/723,756 08/726,412; 08/723,757 assigned to the same assignee as the present application. The pertinent descriptions of those applications are hereby incorporated into the present description by reference.

Although the present invention has been described in detail with respect to a particular embodiment thereof, it will be apparent for those skilled in the art that various modifications are possible with respect to the shown embodiment without departing from the spirit of the present invention.

We claim:

1. A stability control device of a vehicle having a vehicle body, and front left, front right, rear left and rear right wheels, comprising:

a means for estimating a liability of the vehicle body to a turn running instability for producing an instability quantity which generally increases along with increase of said liability;

a brake means for selectively applying a variable braking force to each of said wheels; and a control means for controlling said brake means so as variably to apply a braking force to a selected one or ones of said wheels at a rate calculated based upon said instability quantity for suppressing the vehicle body against said turn running instability;

wherein said control means sets a maximum possible value of said rate so that the maximum possible value is lowered along with increase of time of applying the braking force.

2. A stability control device according to claim 1, wherein said control means cancels an increased part of the lowering of the maximum value along with increase of time of not executing the braking.

3. A stability control device according to claim 1, wherein said control means commences to lower the maximum value according to increase of time of applying the braking force when the increase of time exceeds a threshold value determined therefor.

4. A stability control device according to claim 1, wherein said control means continues to lower the maximum value according to increase of time of applying the braking force only until the increase of time attains a threshold value determined therefor.

5. A stability control device according to claim 1, wherein said turn running instability is spin value which represents a liability of the vehicle body to spin, and said selected wheel to which the braking force is applied is one of the front wheels serving at the outside of a turn running of the vehicle.

* * * * *